US008291954B2

(12) United States Patent
Narita

(10) Patent No.: US 8,291,954 B2

(45) Date of Patent: Oct. 23, 2012

(54) APPLICATION-FILM TRANSFER TOOL

(75) Inventor: Yasuo Narita, Tokyo (JP)

(73) Assignee: Plus Corporation, Tokyo (JP)

( * ) Notice: Subject to any disclaimer, the term of this patent is extended or adjusted under 35 U.S.C. 154(b) by 107 days.

(21) Appl. No.: 12/906,596

(22) Filed: Oct. 18, 2010

(65) Prior Publication Data

US 2011/0120658 A1 May 26, 2011

(30) Foreign Application Priority Data

Nov. 26, 2009 (JP) ................................ 2009-268646

(51) Int. Cl.
*B32B 37/26* (2006.01)
*B26F 3/02* (2006.01)

(52) U.S. Cl. .......... 156/523; 156/577; 118/76; 118/257; 242/160.4; 242/171; 242/588.6

(58) Field of Classification Search .................. 156/538, 156/523, 527, 540, 574, 577, 579; 118/76, 118/200, 257; 225/46; 242/160.2, 160.4, 242/170, 171, 588, 588.2, 588.3, 588.6; 206/411; *B32B 37/00, 37/26; B26F 3/02*
See application file for complete search history.

(56) References Cited

U.S. PATENT DOCUMENTS

| | | | | |
|---|---|---|---|---|
| 6,500,259 | B1 * | 12/2002 | Tamai et al. | 118/76 |
| 6,599,363 | B2 * | 7/2003 | Narita | 118/76 |
| 6,730,186 | B2 * | 5/2004 | Takahashi | 156/238 |
| 6,830,089 | B1 * | 12/2004 | Tamai et al. | 156/577 |
| 7,275,578 | B2 * | 10/2007 | Mitsui et al. | 156/523 |

FOREIGN PATENT DOCUMENTS

| | | | |
|---|---|---|---|
| JP | 2001-096985 | | 4/2001 |
| JP | 2001096985 | A * | 4/2001 |
| JP | 2003-103994 | | 4/2003 |
| JP | 2003103994 | A * | 4/2003 |

* cited by examiner

*Primary Examiner* — Mark A Osele
*Assistant Examiner* — Shawn F Hogan
(74) *Attorney, Agent, or Firm* — Rodman & Rodman

(57) ABSTRACT

The application-film transfer tool includes a main body having a base member and a sliding securing member slidably attached to the base member, a refill attachable to and detachable from the main body and having a supply bobbin, a take-up bobbin, a transfer head, and a refill case, and a refill securing mechanism securing the refill to the main body, wherein the refill is secured to the main body by engaging the engagement protrusions of the refill and the engagement depressions of the base member, latching together the sliding securing member and the section near the front end of the refill, and engaging the section near the back end of the locking member and the hooks.

3 Claims, 14 Drawing Sheets

APPLICATION-FILM TRANSFER TOOL

BACKGROUND OF THE INVENTION

1. Field of the Invention

The present invention relates to an application-film transfer tool in which a transfer tape is replaceable.

2. Description of the Related Art

Application-film transfer tools that transfer an application film, such as correction tape and glue, onto a transfer surface are indispensable stationery. Such application-film transfer tool typically includes a transfer tape made of an application film and a base tape, a supply bobbin around which unused transfer tape is wound, a take-up bobbin that takes up used transfer tape (base tape), and a transfer head that presses the transfer tape against paper or the like. By sliding the application-film transfer tool while the transfer head is pressed against a transfer subject, such as paper, onto which an application film is transferred, the application film is pressure-sensitively transferred.

In the past, many application-film transfer tools were single-use types. Recently, however, from an ecological viewpoint of reducing waste and/or from an economical viewpoint, the transfer tape in a standard type application-film transfer tool has become replaceable or replaceable. In a known type of application-tape transfer tool that allows a transfer tape to be refilled or replaced, a refill, which is an integrated unit of a supply bobbin around which a transfer tape is wound, a take-up bobbin, and transfer head, is loaded onto a main body including shafts and gears for interlocking the supply bobbin and the take-up bobbin.

With such an application-film transfer tool, the refill is held inside the main body by rotatably attaching the supply bobbin and the take-up bobbin of the refill to a shaft included in the main body. With such an application-film transfer tool, however, the rotating bobbins and the shaft may wobble with respect to each other and/or the refill may be displaced, i.e., the refill may move inside the main body.

Japanese Unexamined Patent Application Publication No. 2001-96985 proposes to provide a plurality of receiving parts (latching grooves) for latching on the inner edge of a main body (main body of application tool), providing protrusions (latching protruding edges) for latching on the external line of a refill (cartridge), and to secure the refill to the main body by latching together the receiving parts and the protrusions.

In Japanese Unexamined Patent Application Publication No. 2003-103994, the inventor of the present invention has proposed an application-film transfer tool in which transfer head automatically rotates to a transfer-tape replacement position when the main body is separated to replacing a refill and in which transferring of the tape is possible by the tape being automatically wound around the tip of the transfer head when the separated main body is engaged after the refill is replaced.

SUMMARY OF THE INVENTION

The refill holding strength of the application-film transfer tool of Japanese Unexamined Patent Application Publication No. 2001-96985 is increased by latching together the receiving parts of the main body and the protrusions of the refill. Thus, wobbling and displacement in this application-film transfer tool is prevented to a greater degree than in an application-film transfer tool that hold a refill by rotatably attaching bobbins to the main body. However, wobbling and displacement occurs in the top-to-bottom direction, which is the direction a refill is loaded onto the main body, because a refill is simply placed between the top case and the bottom case of the main body.

With the application-film transfer tool of Japanese Unexamined Patent Application Publication No. 2001-96985, the top case is removed from the bottom case when a refill is to be loaded onto the main body. For this reason, there is a problem in that replacing a refill takes too much time.

In the application-film transfer tool of Japanese Unexamined Patent Application Publication No. 2003-103994, a refill can be easily loaded to the main body by sandwiching the refill with the separated main body, i.e., a first case and a second case. Moreover, this application-film transfer tool has a predetermined size that allows a user to easily slide the first case (grasping part grasping the refill from the back) with his/her finger and hold the application-film transfer tool like a pen when the separated parts of the main body are engaged. Accordingly, the shape of the application-film transfer tool suitable for being held like a pen requires a grasping part (first case), having a predetermined size, be provided toward the back of the refill. As a result, the total length of the application-film transfer tool becomes great, making size reduction difficult.

The present invention has been conceived in light of such problem in the related art and provides a small application-film transfer tool that enables easy replacement of a refill and stable transfer of an application film without wobbling and displacement in the refill loaded onto the main body.

The present invention provides an application-film transfer tool including a main body; a refill that is attached to and detached from the main body; and a refill securing mechanism securing the refill to the main body, wherein the main body includes a base member having a power transmission mechanism interlocking a supply bobbin and a take-up bobbin and a sliding securing member slidably attached to the base member and holding the front end of the refill, wherein the refill includes the supply bobbin around which a transfer tape is wound, the take-up bobbin taking up the transfer tape after use, and a refill case having a transfer head at the front end, wherein the refill securing mechanism includes a plurality of engagement protrusions and a plurality of hooks, all provided on a surface of the refill case, the surface facing the main body when the refill is loaded onto the main body, engagement depressions provided on the base member, a locking member slidably attached to the base member, and the sliding securing member, and wherein the refill is secured to the main body by engaging the engagement protrusions of the refill with the engagement depressions of the base member, latching together the sliding securing member and a section near the front end of the refill, and latching together the locking member and the hooks.

In the application-film transfer tool according to the present invention, the engagement protrusions may be provided on a surface of the refill case near the back end and near both sides, the surface facing the main body when the refill is placed on the main body; each of the hooks may include a back face plate provided near and inward of the engagement protrusions and positioned toward the back, an inner face plate extending toward the front and perpendicularly from the inner edge of the back face plate, and a bottom face plate provided perpendicularly to the bottom edges of the back face plate and the bottom edge of the inner face plate; the locking member may include two parallel latching rods extending in the front-to-back direction and a connecting member connecting the two latching rods near the back ends; and the back end of the refill may be latched together with the main body as a result of the front end sections of the latching rods contacting the back end section of the sliding securing member when the sliding securing member slides toward the back, the locking member sliding toward the back, and the back ends of the latching rods being inserted into the hooks.

Furthermore, in the application-film transfer tool according to the present invention, the back end of the connecting member of the locking member may have a resilient part, and the locking member may be urged toward the front by engaging the back face plate of the base member and the resilient part.

In the application-film transfer tool according to the present invention, the refill has a plurality of engagement protrusions and a plurality of hooks. The main body includes engagement depressions that are engaged with the engagement protrusions of the refill and a locking member latched together with the hooks of the refill. In this way, with the application-film transfer tool according to the present invention, when the refill is loaded onto the main body, the refill can be easily positioned by engaging the engagement protrusions and the engagement depressions. Furthermore, with the application-film transfer tool according to the present invention, by latching together the hooks and the locking member, the refill can be prevented from detaching from the main body, and wobbling during use can be prevented.

The hooks described above are provided on the refill case near the back end of a surface that faces the main body when the refill is placed on the main body, and the back end section of the refill is latched together with the locking member. In this way, since the front of the refill is held by the sliding securing member and the back is latched together with the locking member, the refill can be reliably secured to the main body.

Moreover, in the application-film transfer tool according to the present invention, the back end of the locking member has a resilient part, and the locking member is urged toward the front as a result of the back face plate of the base member engaging with the resilient part. In this way, in the application-film transfer tool according to the present invention, since the latching of the hooks and the locking member is automatically released when the sliding securing member is slid toward the front, the refill can be easily attached to and detached from the main body.

The present invention provides a small application-film transfer tool that enables easy replacement of a refill and stable transfer of an application film without wobbling and displacement in the refill loaded onto the main body.

DESCRIPTION OF THE PREFERRED EMBODIMENTS

Figure 1:
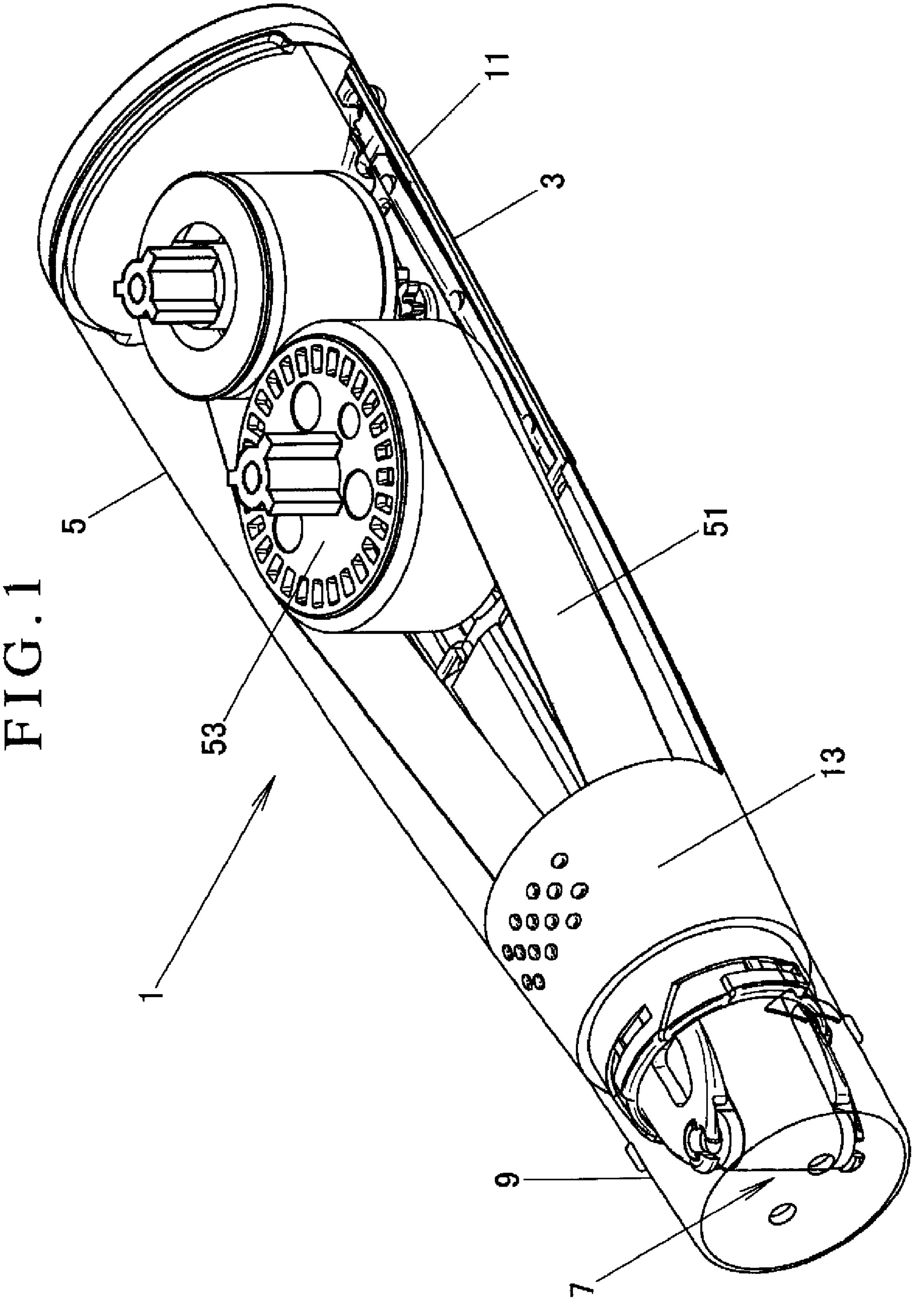
FIG. 1 is a perspective view illustrating an application-film transfer tool according to an embodiment of the present invention.

An application-film transfer tool 1 according to an embodiment of the present invention includes a main body 3 and a refill 5 that is attachable to and detachable from the main body 3. The main body 3 includes a base member 11, which has a power transmission mechanism interlocking a supply bobbin 53 and a take-up bobbin 55, and a sliding securing member 13 that is slidably attached to the base member 11 and holds the refill 5.

The refill 5 includes a refill case having a transfer head 7 at its front end and the supply bobbin 53 and take-up bobbin 55 stored in the refill case. A transfer tape 51 is wound around the supply bobbin 53, which supplies the unused transfer tape 51. The take-up bobbin 55 takes up the used transfer tape 51, i.e., base-material tape.

The application-film transfer tool 1 includes a refill securing mechanism that secures the refill 5 to the main body 3. The refill securing mechanism includes a plurality of engagement protrusions 72 and a plurality of hooks 73 that are all provided on the refill case on a surface of facing the main body 3 when the refill 5 is loaded, engagement depressions **23*d* provided on the base member 11 of the main body 3, the sliding securing member 13, and a locking member 31 that is slidably attached to the base member 11**.

The refill 5 is placed on the base member 11 such that the engagement protrusions 72 are engaged with the engagement depressions **23*d* of the base member 11, and the sliding securing member 13 secures the section near the front end of the refill 5. The refill 5 is secured to the main body 3 by engaging the section near the back end of the locking member 31 and the hooks 73**.

The engagement protrusions 72 of the refill 5 are provided near the back end of the bottom surface near the edges of the sides of the refill case. The hooks 73 each include a back face plate **73*a* provided near and inward of the engagement protrusions 72 and positioned toward the back, an inner face plate 73*b* extending toward the front and perpendicularly from the inner edge of the back face plate 73*a***, and a bottom face plate 73*c* provided perpendicularly to the bottom edges of the back face plate 73*a* and inner face plate 73*b*. The locking member 31 includes two parallel latching rods 32 extending in the front-to-back direction and a connecting member 33 connecting the two latching rods 32 near the back ends.

Then, in the application-film transfer tool 1, when the sliding securing member 13 slides toward the back, the back end of the refill 5 is latched together with the main body 3 as a result of the front end sections of the latching rods 32 contacting the back end section of the sliding securing member 13, the locking member 31 sliding toward the back by being urged toward the back by the sliding securing member 13, and the back ends of the latching rods 32 being inserted into the hooks 73.

A resilient part 33*d* is provided on the back end of the connecting member 33 of the locking member 31. By engaging the resilient part 33*d* with a back face plate 21 of the base member 11, the locking member 31 is urged toward the front.

Embodiment

Figure 2:
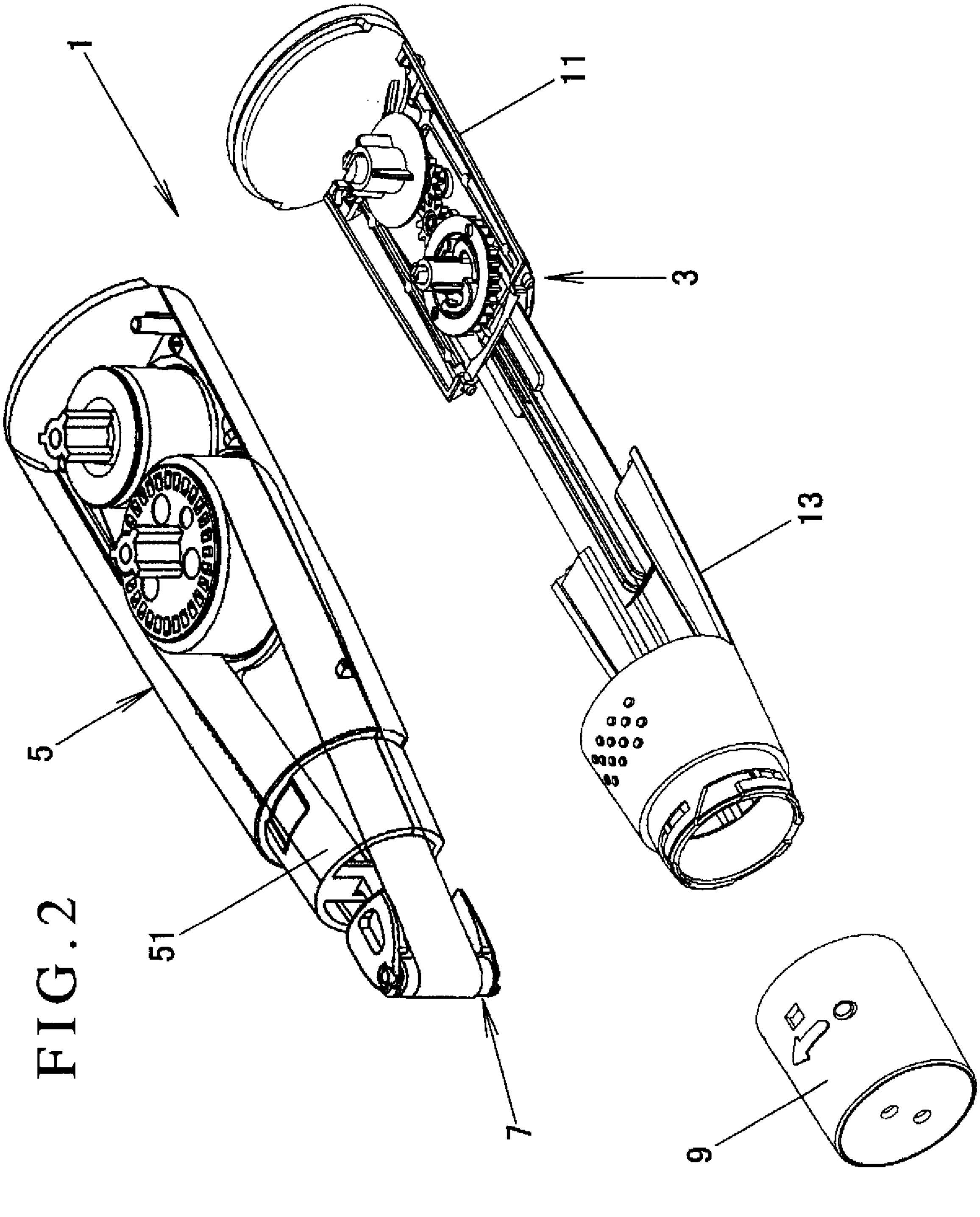
FIG. 2 is a perspective view illustrating a refill and a main body of the application-film transfer tool according to an embodiment of the present invention in a separated state.

The application-film transfer tool 1 according to the present invention will be described in detail below with reference to the drawings. FIG. 1 is an external perspective view illustrating the application-film transfer tool 1 according to an embodiment. FIG. 2 is a perspective view illustrating the refill 5 and the main body 3 in a separated state. In this specification, "front" refers to the area where the transfer head 7 of the application-film transfer tool 1 is positioned in FIG. 1; "back" refers to the area where the base member 11 of the main body 3 is positioned; "top" refers to the area where the refill 5 is positioned; "bottom" refers to the area where the main body 3 is positioned; and "traverse direction" refers to the direction orthogonal with the forward, backward, upward, and downward directions.

The application-film transfer tool 1 according to this embodiment is capable of pressure-sensitively transferring an application film of the transfer tape 51, which is formed by applying the application film onto a base tape, onto a transfer subject by sliding the transfer head 7 on the transfer subject, such as paper, while the transfer head is pressed against the transfer subject. As illustrated in FIG. 1, the application-film transfer tool 1 includes the main body 3 positioned toward the bottom, the refill 5 attachable to and detachable from the main body 3, and a cap 9 that protects the transfer head 7. As illustrated in FIG. 2, the main body 3 includes the base member 11 positioned toward the back and the sliding securing member 13 attached in such a manner that it slides in the front-to-back direction with respect to the base member 11.

The application-film transfer tool 1 according to this embodiment is capable of replacing the refill 5 by placing the refill 5 onto the base member 11 from the top with the main body 3 slid toward the front with respect to the base member 11, then, sliding the sliding securing member 13 toward the back with respect to the base member 11, and loading the refill 5 onto the main body 3.

Figure 3:
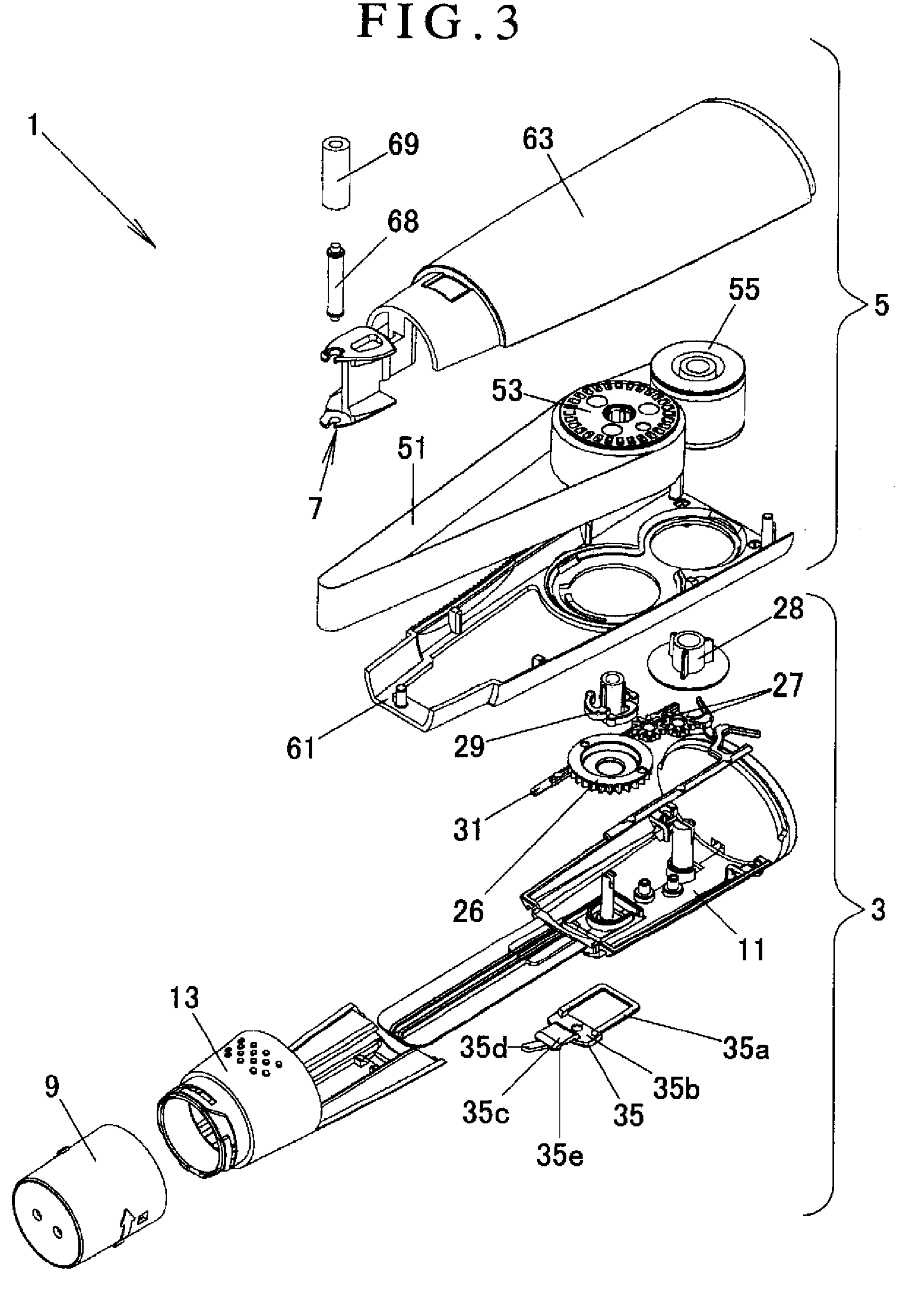
FIG. 3 is an exploded perspective view illustrating the application-film transfer tool according to an embodiment of the present invention.

The components included in the application-film transfer tool 1 according to this embodiment will be described in detail below. FIG. 3 is an exploded perspective view illustrating the application-film transfer tool 1 according to this embodiment. The main body 3 includes the base member 11, the sliding securing member 13, a supply-side gear 26, which is a power transmission mechanism interlocking the supply bobbin 53 and take-up bobbin 55 of the refill 5, two flat gears 27, a take-up gear 28, a clutching member 29, the locking member 31, which is a refill securing mechanism holding the refill 5, and a latching member 35 that latches together with the sliding securing member 13.

Figure 4:
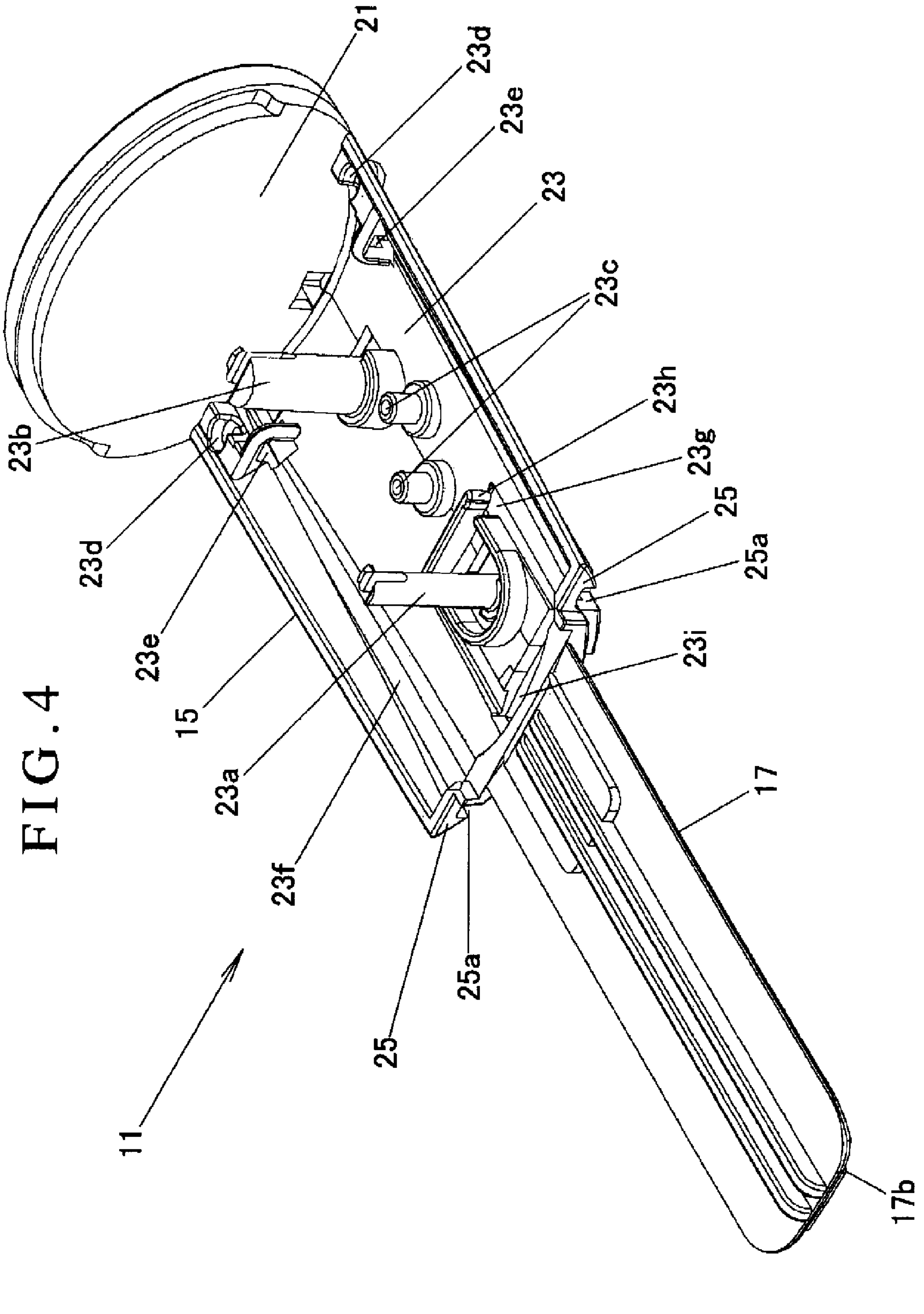
FIG. 4 is a perspective view illustrating a base member included in the application-film transfer tool according to an embodiment of the present invention.

As illustrated in FIG. 4, the base member 11 of the main body 3 includes a base 15 positioned toward the back and a sliding support plate 17 that extends from the front end of the base 15 toward the front.

The base 15 on which the power transmission mechanism is disposed includes the elliptical back face plate 21 positioned at the back end, a curved refill setting plate 23 extending toward the front from the circumference on the bottom of the back face plate 21, and front face plates 25 that are provided on both sides at the front end of the refill setting plate 23.

A supply-side shaft 23*a* is provided perpendicular to the refill setting plate 23 on the inner surface of the refill setting plate 23, i.e., near the front edge of the top surface of the refill setting plate 23. The supply-side gear 26 and the clutching member 29, which are illustrated in FIG. 3, are rotatably attached to the supply-side shaft 23*a*. A take-up-side shaft 23*b* is provided perpendicular to the refill setting plate 23 near the back edge of the inner surface of the refill setting plate 23. The take-up gear 28, which is illustrated in FIG. 3, is rotatably attached to the take-up-side shaft 23*b*. Two flat-gear shafts 23*c* are provided perpendicularly to the refill setting plate 23 on the inner surface of the refill setting plate 23 between the supply-side shaft 23*a* and the take-up-side shaft 23*b*. Two flat gears 27, which are illustrated in FIG. 3, are rotatably attached to the flat-gear shafts 23*c*.

The engagement depressions 23*d* are provided at both edges near the back edge of the inner surface of the refill setting plate 23. The engagement depressions 23*d* are engaged with the engagement protrusions 72, which are described below, of the refill 5 when the refill 5 is loaded onto the main body 3. Back insertion parts 23*e*, which have openings, are provided near the front sections of the engagement depressions 23*d*. The back legs, which are described below, of the locking member 31 are inserted into the back insertion parts 23*e*.

Front insertion parts 25*a*, which have openings, are provided in the border area between the front face plates 25 and the refill setting plate 23. The front end of the locking member 31 is inserted into the front insertion parts 25*a*. The front insertion parts 25*a* and the back insertion parts 23*e* are positioned on straight lines in the front-to-back direction such that the corresponding openings oppose each other. Sliding grooves 23*f* that support the sliding of the locking member 31 is provided between the front insertion parts 25*a* and the back insertion parts 23*e* on the inner surface of the refill setting plate 23.

A rectangular groove 23*g* is provided around the supply-side shaft 23*a* on the inner surface of the refill setting plate 23. The latching member 35, which is described below, is disposed in this rectangular groove 23*g*. A back wall 23*h* is provided at the back edge of the rectangular groove 23*g*, and a penetration part 23*i*, which is an opening, is provided at the front edge of the rectangular groove 23*g*. The tip of the latching member 35 is inserted into the penetration part 23*i*.

The sliding support plate 17 is a substantially rectangular plate extending from the front edge of the refill setting plate 23 toward the front. The sliding securing member 13, which is illustrated in FIG. 3, is slidably attached to the sliding support plate 17. A detachment preventing protrusion 17*b* is provided at the front edge on the bottom surface of the sliding support plate 17 to prevent the sliding securing member 13 from being detached when the sliding securing member 13 is mounted.

Figure 5:
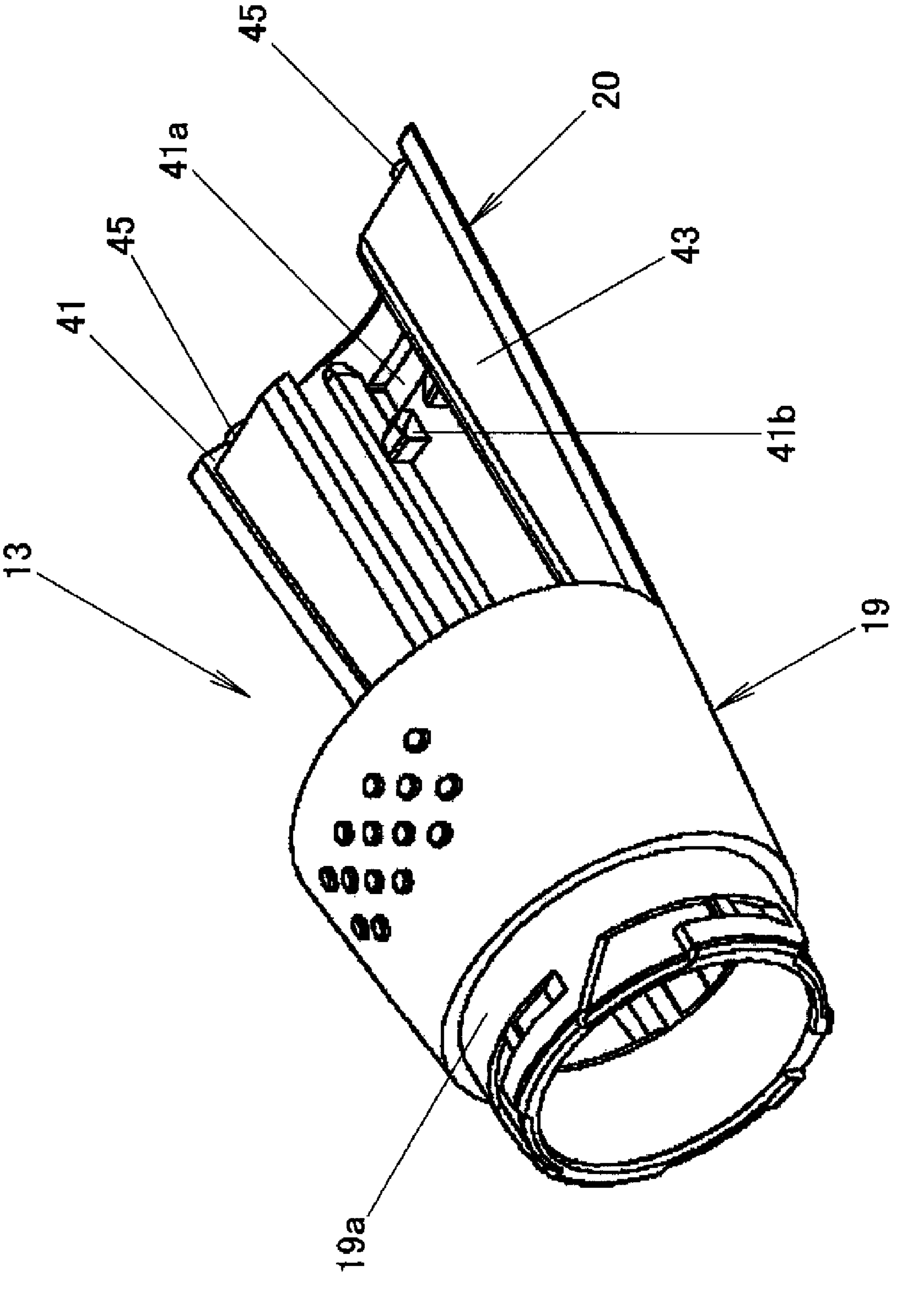
FIG. 5 is a perspective view illustrating a sliding securing member included in the application-film transfer tool according to an embodiment of the present invention.

As illustrated in FIG. 5, the sliding securing member 13 includes a substantially cylindrical refill holding part 19, which is positioned at the front end and has opening at the front and the back, and a sliding part 20, which extends from the bottom edge of the refill holding part 19 toward the back. The refill holding part 19 is slightly tapered toward the front. A cap attachment part 19*a* to which the cap 9 is attached is provided at the front end section. When the refill 5 is loaded onto the main body 3, the refill holding part 19 holds the section near the front end of the refill 5 while the transfer head 7 protrudes toward the front.

The sliding part 20 includes curved face plate 41, which is positioned below the refill holding part 19 and extends from the circumferential area toward the back, and two flat plates 43 extending inward from the section near the edges of the curved face plate 41. Each of the flat plates 43 extends from the back end of the curved face plate 41 to the front edge of the inner surface of the refill holding part 19. A gap in which the sliding support plate 17 of the base member 11 illustrated in FIG. 4 is disposed is provided between the curved face plate 41 and the flat plates 43.

A latching opening 41*a*, which is latched together with the latching member 35, is provided near the center of the back edge of the curved face plate 41. A detachment preventing protrusion 41*b*, which is latched together with the detachment preventing protrusion 17*b* of the sliding support plate 17, is provided near the front edge of the latching opening 41*a*. Pressure-sensitive protrusions 45 are provided on the back end surface of the sliding part 20 near the corners formed by the curved face plate 41 and the flat plates 43. The pressure-sensitive protrusions 45 contact the front end of the locking members 31 and push the locking member 31 toward the back.

The sliding support plate 17 of the base member 11, which is illustrated in FIG. 4, is inserted into the gap between the curved face plate 41 and the flat plates 43 of the sliding securing member 13. The sliding securing member 13 is attached to the base member 11 in such a manner that it slides in the front-to-back direction with respect to the sliding support plate 17. When the sliding securing member 13 slides to the frontmost end, the detachment preventing protrusion 17*b* of the sliding support plate 17 and the detachment preventing protrusion 41*b* of the sliding securing member 13 are latched together. Thus, the sliding securing member 13 does not become detached from the sliding support plate 17.

Figure 6:
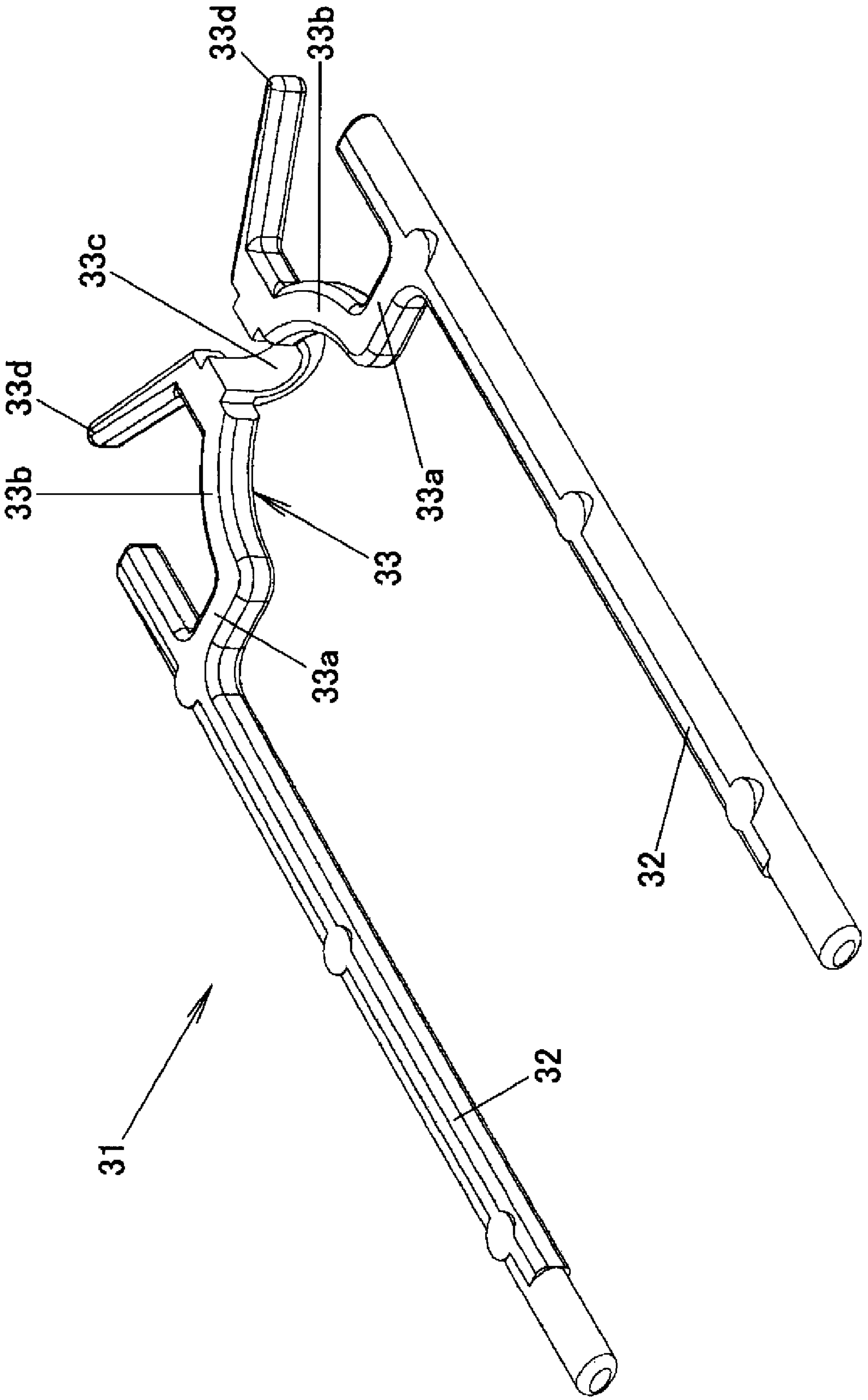
FIG. 6 is a perspective view illustrating a locking member included in the application-film transfer tool according to an embodiment of the present invention.

As illustrated in FIG. 6, the locking member 31 includes the two latching rods 32, which are disposed in a parallel manner and extend in the front-to-back direction, and the connecting member 33, which connect the two latching rods 32 near the back ends. The connecting member 33 includes symmetrically arranged straight parts 33*a* and curved parts 33*b*, where the straight parts 33*a* extend perpendicularly inward from near the back end of the latching rods 32 and the curved parts 33*b* are curved from the inner edges of the straight parts 33*a* toward the back. The connecting member 33 includes an arc-shape connecting part 33*c*, which connects back ends of the left and right curved parts 33*b* by extending from the inner sides near the back ends of the curved parts 33*b*. Resilient parts 33*d*, which are constituted of rods extending such that they spread out, are provided at the back ends of the curved parts 33*b*.

Figure 7:
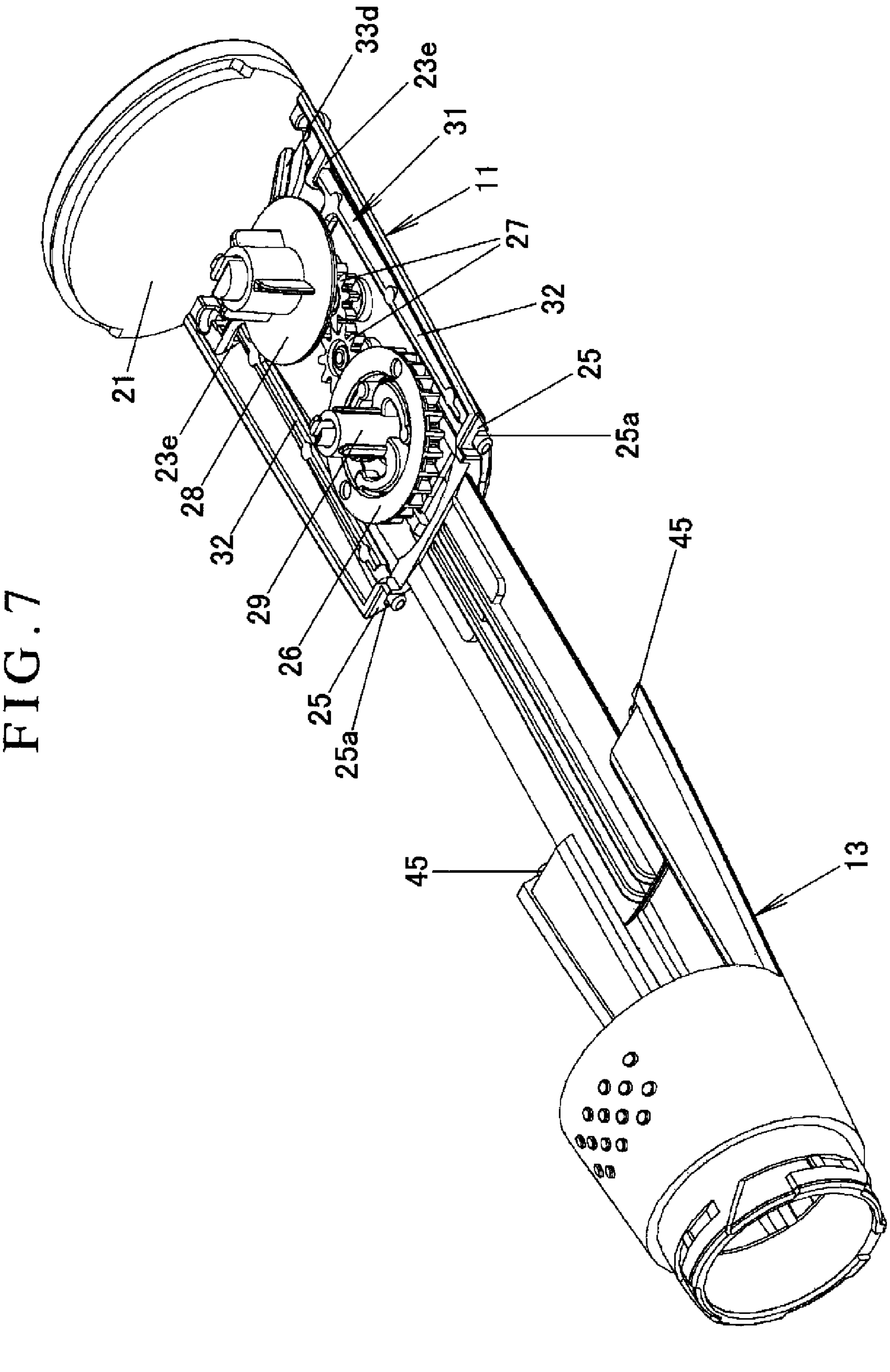
FIG. 7 is a perspective view illustrating the sliding securing member included in the main body of the application-film transfer tool according to an embodiment of the present invention in an open state.

As illustrated in FIG. 7, the locking member 31 is attached to the base member 11 such that the front ends of the latching rods 32 are inserted into the openings of the front insertion parts 25*a* of the base member 11 and the back ends of the latching rods 32 are inserted into the openings of the back insertion parts 23*e* of the base member 11. The locking member 31 is urged toward the front by the resilient parts 33*d* being engaged to the back face plate 21 of the base member 11. When the pressure-sensitive protrusions 45 of the sliding securing member 13 and the front ends of the latching rods 32 are not in contact, the front end sections of the latching rods 32 protrude toward the front from the front face plates 25 of the base member 11.

Figure 8:
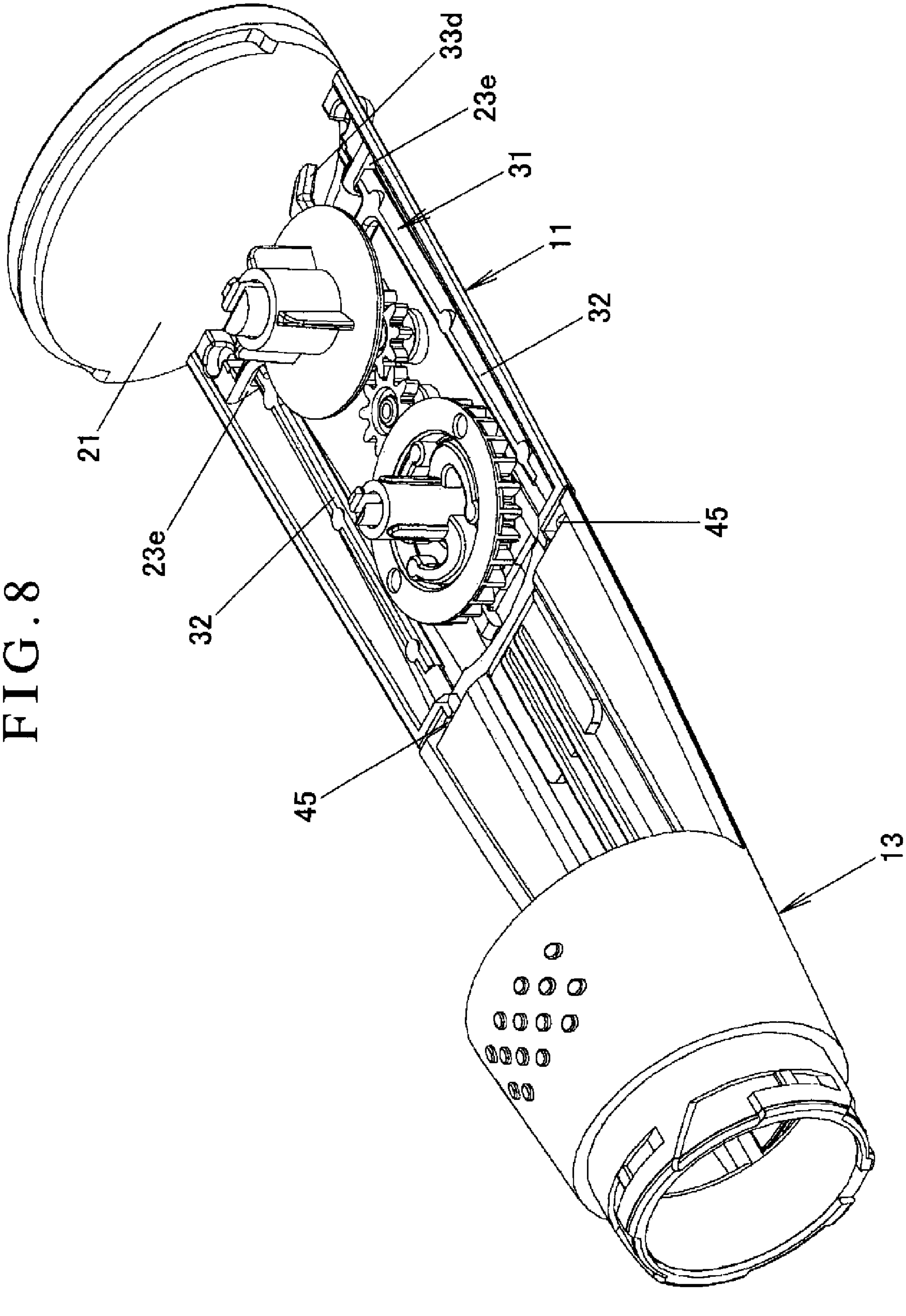
FIG. 8 is a perspective view illustrating the sliding securing member included in the main body of the application-film transfer tool according to an embodiment of the present invention in a closed state.

As illustrated in FIG. 8, when the sliding securing member 13 slides toward the back, the front ends of the latching rods 32 contact the pressure-sensitive protrusions 45 of the sliding securing member 13, and the locking member 31 is urged by the sliding securing member 13 and slides toward the back. At this time, the resilient parts 33*d* of the locking member 31 are pressed against the back face plate 21 of the application-film transfer tool 1 and bend. The locking member 31 is an essential member for securing the refill 5 to the main body 3, and the relationship between the locking member 31 and the refill 5 will be described below.

As illustrated in FIG. 3, the latching member 35 includes a squared U-shaped frame 35*a* with the front side open, a substantially rectangular operating part 35*b* that is connected to the front end of the frame 35*a*, a latching part 35*c* that extends toward the front from the top surface of the operating part 35*b* near the front end, and a resilient part 35*d* that extends toward the front obliquely upward from the front end of the latching part 35*c*. A latching protrusion 35*e* that latches together with the latching opening 41*a* of the sliding securing member 13 is provided on the bottom surface of the latching part 35*c* at the front end section.

Figure 9:
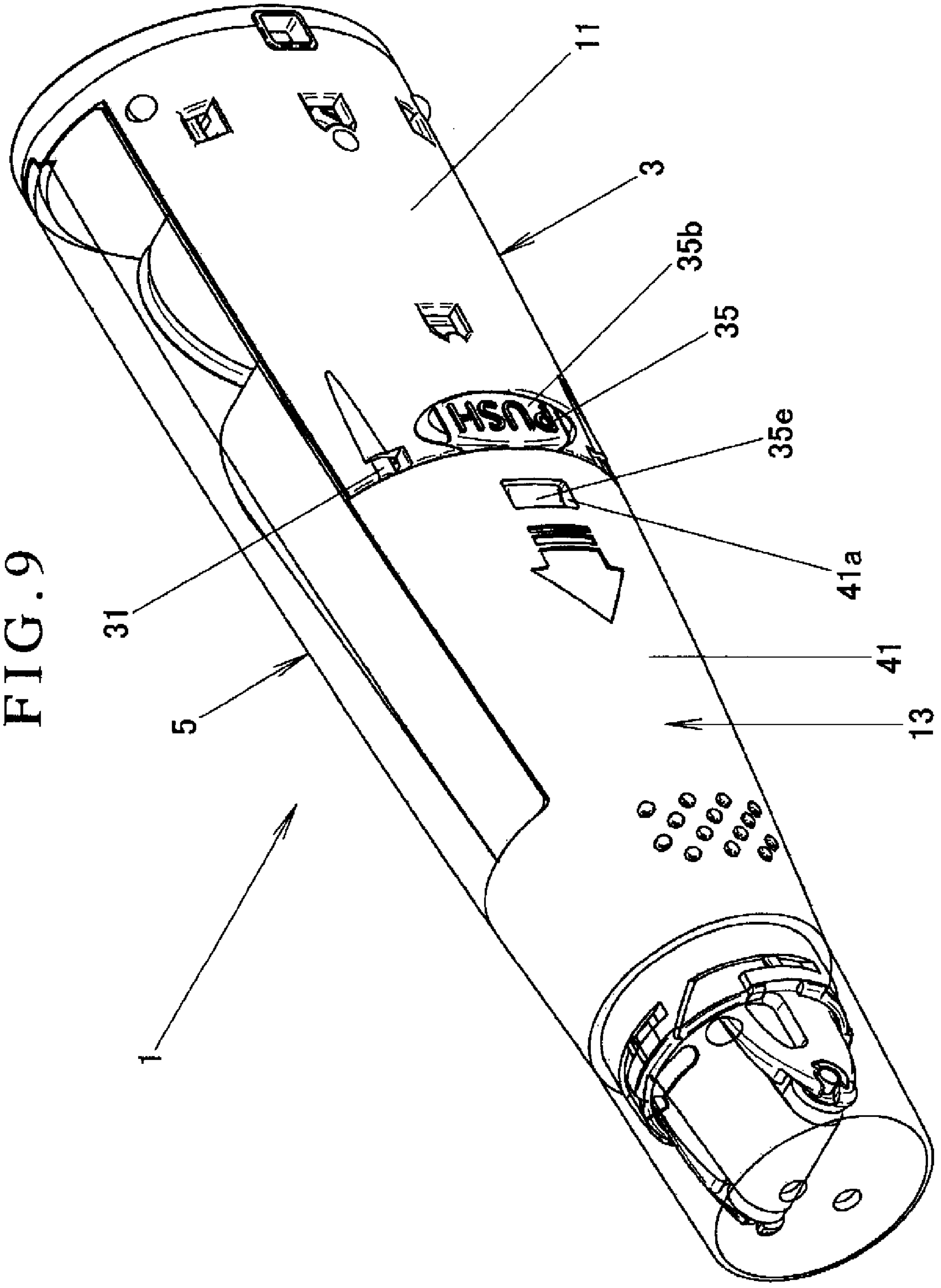
FIG. 9 is a perspective view, viewed from the side of the main body, illustrating the application-film transfer tool according to an embodiment of the present invention.

The latching member 35 is disposed in the rectangular groove 23*g* with the supply-side shaft 23*a* of the base member 11, which is illustrated in FIG. 4, inserted through the inner side of the frame 35*a*. The section further toward the front than the operating part 35*b* protrudes from the penetration part 23*i* of the base member 11 below the sliding support plate 17. In this state, when the sliding securing member 13 is slid toward the back, the latching part 35*c* and resilient part 35*d* of the latching member 35, which are illustrated in FIG. 3, are inserted between the top surface of the curved face plate 41 of the sliding securing member 13 and the bottom surface of the sliding support plate 17 of the base member 11, which is illustrated in FIG. 4. As illustrated in FIG. 9, the latching protrusion 35*e* provided at the front end of the latching part 35*c* is latched together with the latching opening 41*a* of the sliding securing member 13. In this way, the sliding securing member 13 is latched together with the latching member 35 while being in close contact with the base member 11 and while the locking member 31 is pushed toward the back.

When the operating part 35*b* of the latching member 35 is pushed while the sliding securing member 13 is latched together with the latching member 35, the latching of the latching protrusion 35*e* provided at the front end of the latching part 35*c* and the latching opening 41*a* of the sliding securing member 13 is released. Then, the sliding securing member 13 slides slightly toward the front by being urged toward the front by the locking member 31 and becomes freely slidable in the front-to-back direction.

As illustrated in FIG. 7, the supply-side gear 26 is a disk having teeth on the outer surface and has a depression in the top surface section in which the clutching member 29 is disposed. The supply-side gear 26 is inserted through the supply-side shaft 23*a* of the base member 11.

The clutching member 29 includes a cylinder, a plurality of arms provided on the side surface of the cylinder near the bottom edge, and a protrusion that engages with the supply bobbin 53 provided above the arms on the side surface of the cylinder. The plurality of arms of clutching member 29 is engaged with the depression formed in the top surface of the supply-side gear 26. The clutching member 29 is rotatably supported on the supply-side shaft 23*a* of the base member 11 in such a manner that the arms idles between the clutching member 29 and the supply-side gear 26.

The take-up gear 28 includes a cylinder, a disk provided at the bottom edge of the cylinder, and a gear (not shown) provided on the bottom of the disk. Protrusions that engage with the take-up bobbin 55 are provided on the side surface of the cylinder. The take-up gear 28 is rotatably supported on the take-up-side shaft 23*b* of the base member 11. The outer diameter of the cylinder of the take-up gear 28 is greater than the outer diameter of the cylinder of the clutching member 29.

The two flat gears 27 are rotatably supported on the flat-gear shafts 23*c* of the base member 11 and interlock the supply-side gear 26 and the take-up gear 28. Thus, the application-film transfer tool 1 according to this embodiment has a configuration in which the clutching member 29 rotates together with the supply bobbin 53 of the refill 5, the supply-side gear 26 rotates due to the frictional force generated at the clutching member 29, the take-up gear 28 rotates via the interlocked flat gears 27, and the take-up bobbin 55 of the refill 5 rotates.

Next, the refill 5 will be described. As illustrated in FIG. 3, the refill 5 includes the refill case having the transfer head 7 at the front end and the supply bobbin 53 and take-up bobbin 55 stored in the refill case. The refill case includes a placement case 61 and a cover case 63 having the transfer head 7 at the front end.

Figure 10:
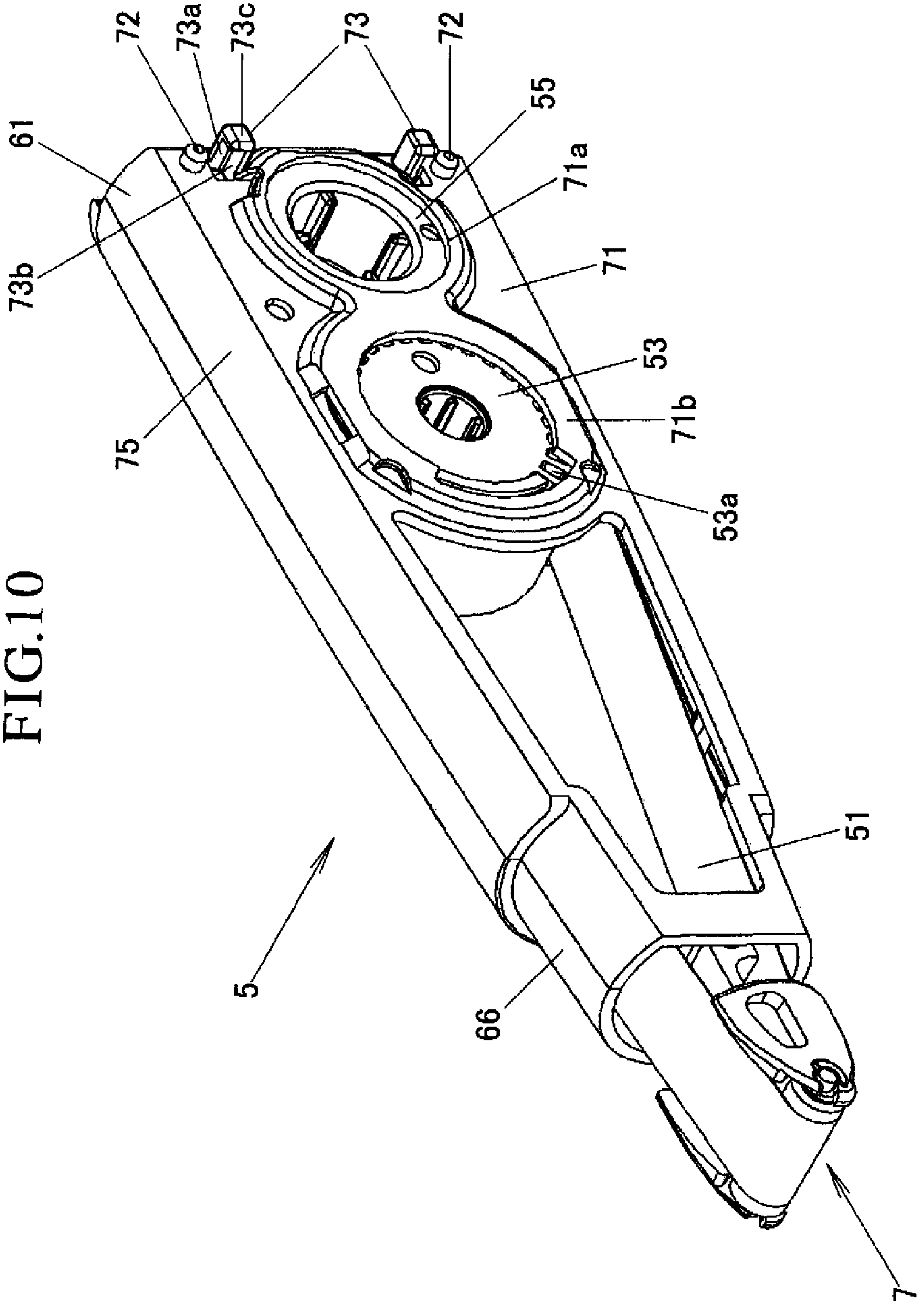
FIG. 10 is a perspective view, viewed from the side of the main body, illustrating the refill of the application-film transfer tool according to an embodiment of the present invention.

As illustrated in FIG. 10, the placement case 61 includes a placement face plate 71 on the bottom side, i.e., the side placed on the main body 3, and sidewalls 75 vertically erecting from both sides of the placement face plate 71. The placement face plate 71 includes a circular take-up-bobbin placing part 71*a* where the take-up bobbin 55 is disposed and a circular supply-bobbin placing part 71*b* where the supply bobbin 53 is disposed; the take-up-bobbin placing part 71*a* is disposed near the back edge of the placement face plate 71; and the supply-bobbin placing part 71*b* is disposed in front of the take-up-bobbin placing part 71*a*. An insertion part 66, which is inserted into the refill holding part 19 of the sliding securing member 13, is provided near the front edges of the sidewalls 75.

The cylindrical engagement protrusions 72 protrude downward from the bottom surface of the placement face plate 71, i.e., from near the back edge of the surface that is placed on the main body 3. When the refill 5 is loaded onto the main body 3, the engagement protrusions 72 engage with the engagement depressions 23*d* of the base member 11 (see FIG. 4).

The hooks 73, which are latched together with the locking member 31, are provided in near sections inward of the engagement protrusions 72. The hooks 73 each have the back face plate 73*a* positioned toward the back, the inner face plate 73*b* extending toward the front and perpendicularly from the inner edge of the back face plate 73*a*, and the bottom face plate 73*c* connected perpendicularly to the bottom edges of the back face plate 73*a* and inner face plate 73*b*.

Figure 11:
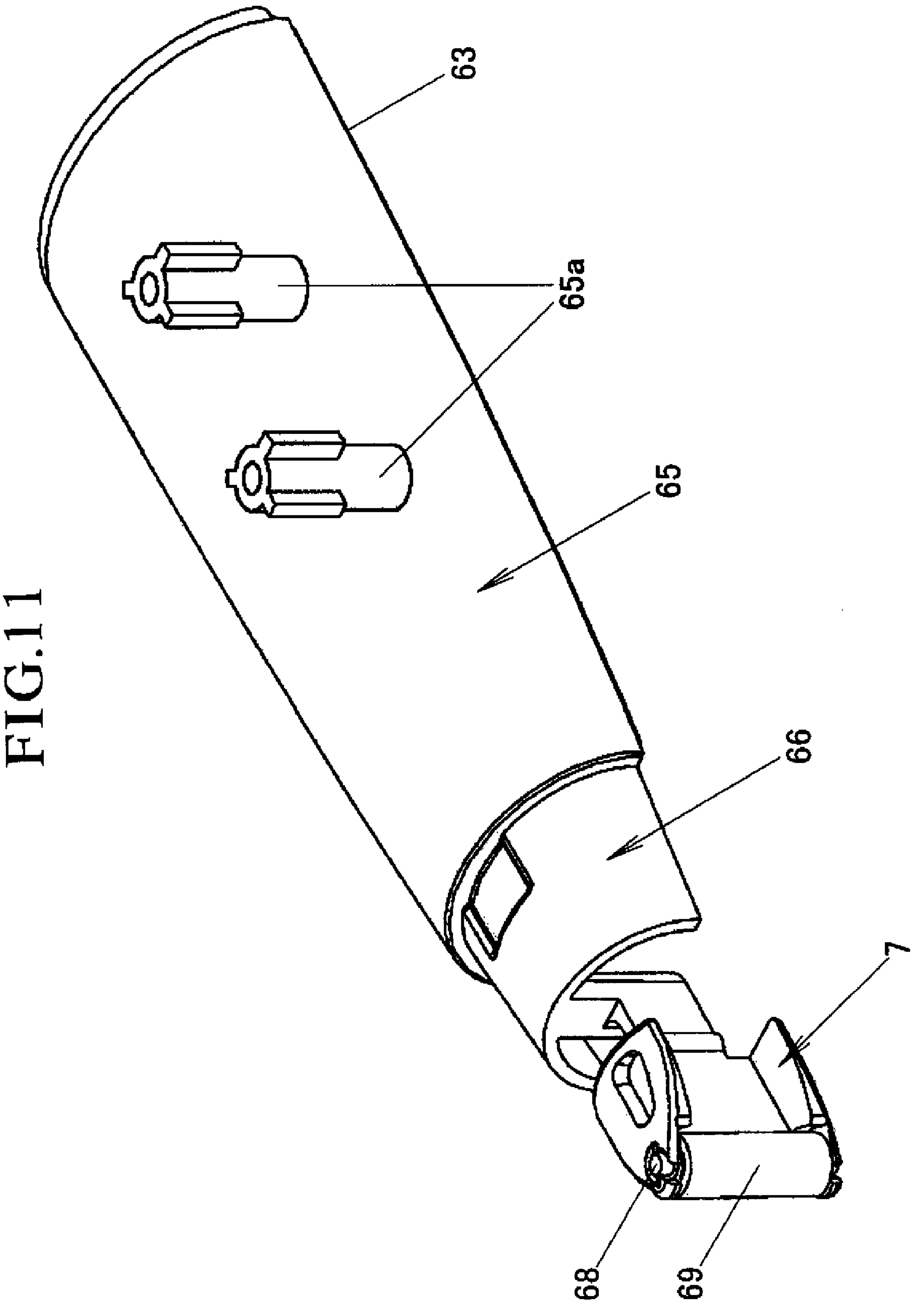
FIG. 11 is a perspective view illustrating a cover case of the application-film transfer tool according to an embodiment of the present invention.

The cover case 63 is engaged with the placement case 61 to accommodate, in a sealed manner, the supply bobbin 53 and the take-up bobbin 55. As illustrated in FIG. 11, the cover case 63 includes the case main body 65, which is positioned toward back, the insertion part 66, which is positioned adjacent to the front edge of the case main body 65 and is inserted into the refill holding part 19 of the sliding securing member 13, and the transfer head 7 positioned adjacent to the front edge of the insertion part 66.

The case main body 65 includes the two supporting shafts 65*a* on the inner surface near the back edge. The supporting shafts 65*a* position the supply bobbin 53 and the take-up bobbin 55 when the cover case 63 is engaged with the placement case 61 and prevent the supply bobbin 53 and the take-up bobbin 55 from wobbling in the top-to-bottom direction.

The transfer head 7 protrudes from the insertion part 66 toward the front. A shaft 68 and a tube 69 are secured to the tip area of the transfer head 7. The transfer tape 51 is extended around the transfer head 7. Thus, the application tape can be transferred to the transfer subject by pressing and moving the transfer head 7 against the transfer subject.

The cover case 63 is engaged with the placement case 61 with the supporting shafts 65*a* inserted into the cylinders of the supply bobbin 53 and take-up bobbin 55. As illustrated in FIG. 1, the transfer tape 51 is connected to the take-up bobbin 55 via the supply bobbin 53 and the transfer head 7 at the front end of the cover case 63.

Next, the refill securing mechanism and a method of loading the refill 5 in the main body 3 will be described. The refill securing mechanism includes the placement face plate 71 and the hooks 73 provided on the refill case, the engagement depressions 23*d* provided on the base member 11, the locking member 31, and the sliding securing member 13.

As illustrated in FIG. 7, when the frontmost section of the sliding securing member 13 is open, the refill 5 is inserted into the refill holding part 19 of the sliding securing member 13 can be placed onto the main body 3 straight from above, without tilting the refill 5 with respect to the main body 3, i.e., without carrying out steps such as tilting the transfer head 7 before inserting it into the refill holding part 19, and then placing the back end of the refill 5 onto the base member 11.

Figure 12:
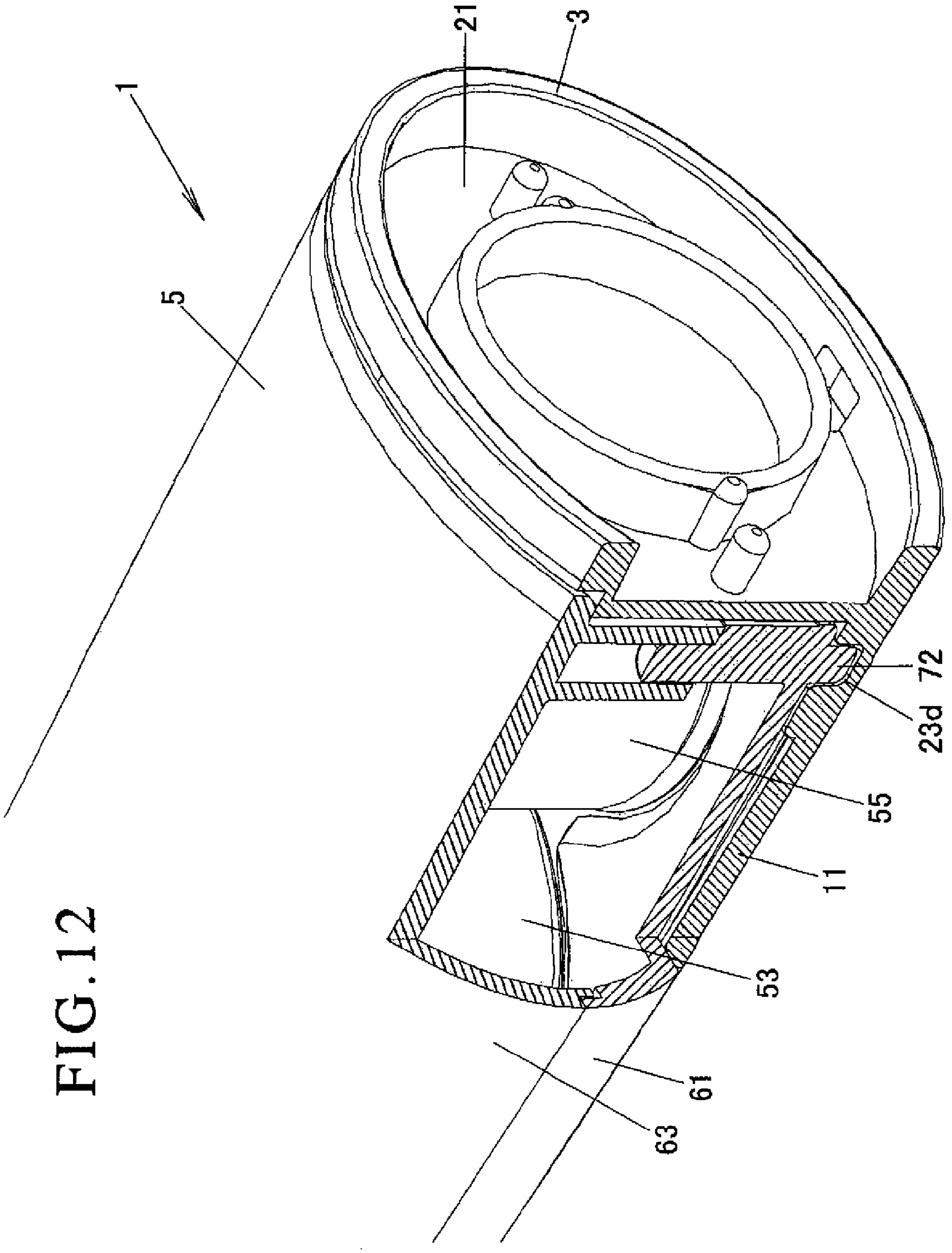
FIG. 12 is a partially cut-away perspective view of the application-film transfer tool according to an embodiment of the present invention.

As illustrated in FIG. 12, when the refill 5 is placed on the main body 3, the refill 5 is positioned by engaging the engagement protrusions 72 of the refill 5 and the engagement depressions 23*d* of the main body 3. Furthermore, when the refill 5 is placed on the main body 3, the supply bobbin 53 is rotatably supported on the cylinder of the clutching member 29 (see FIG. 7), and the take-up bobbin 55 is rotatably supported on the cylinder of the take-up gear 28.

Figure 13:
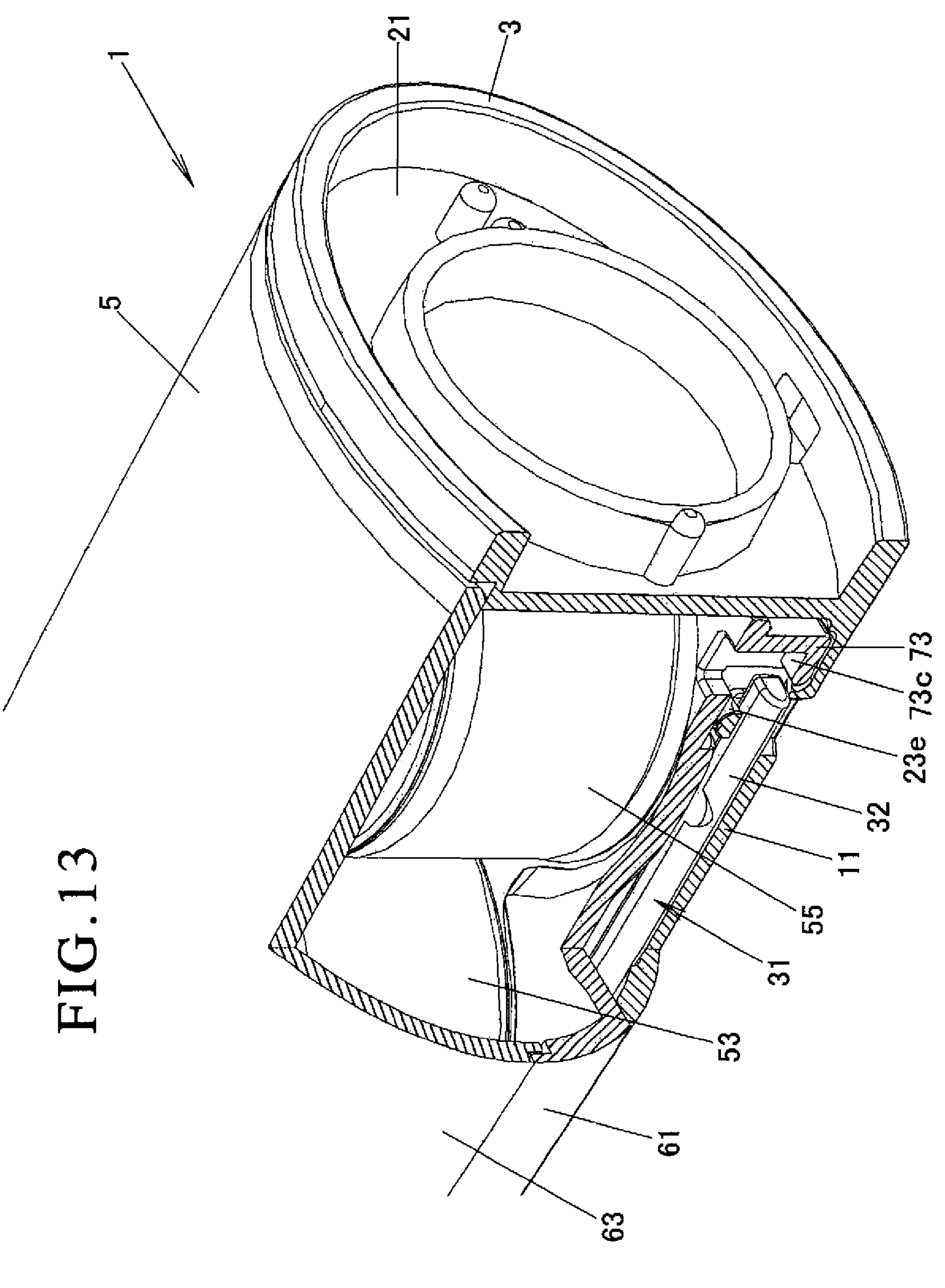
FIG. 13 is a partially cut-away perspective view of the application-film transfer tool according to an embodiment of the present invention.

Since the engagement protrusions 72, which are disposed on both sides of the refill 5, are engaged with the engagement depressions 23*d*, which are disposed on both sides of the main body 3, when the refill 5 is placed on the main body 3 in such manner, movement of the refill 5 in the front-to-back direction and traverse direction is restricted. As illustrated in FIG. 13, since the locking member 31 is disposed toward the front, the hooks 73 of the refill 5 and back ends of the latching rods 32 of the locking member 31 are not engaged, and the refill 5 can be detached from above.

As illustrated in FIG. 1, when the sliding securing member 13 is closed by sliding it toward the back after loading the refill 5 onto the main body 3, the insertion part 66 (see FIG. 10), which is disposed at the tip of the refill 5, is inserted into the refill holding part 19 (see FIG. 5) of the sliding securing member 13. Thus, the front end section of the refill 5 is latched together with the sliding securing member 13.

Figure 14:
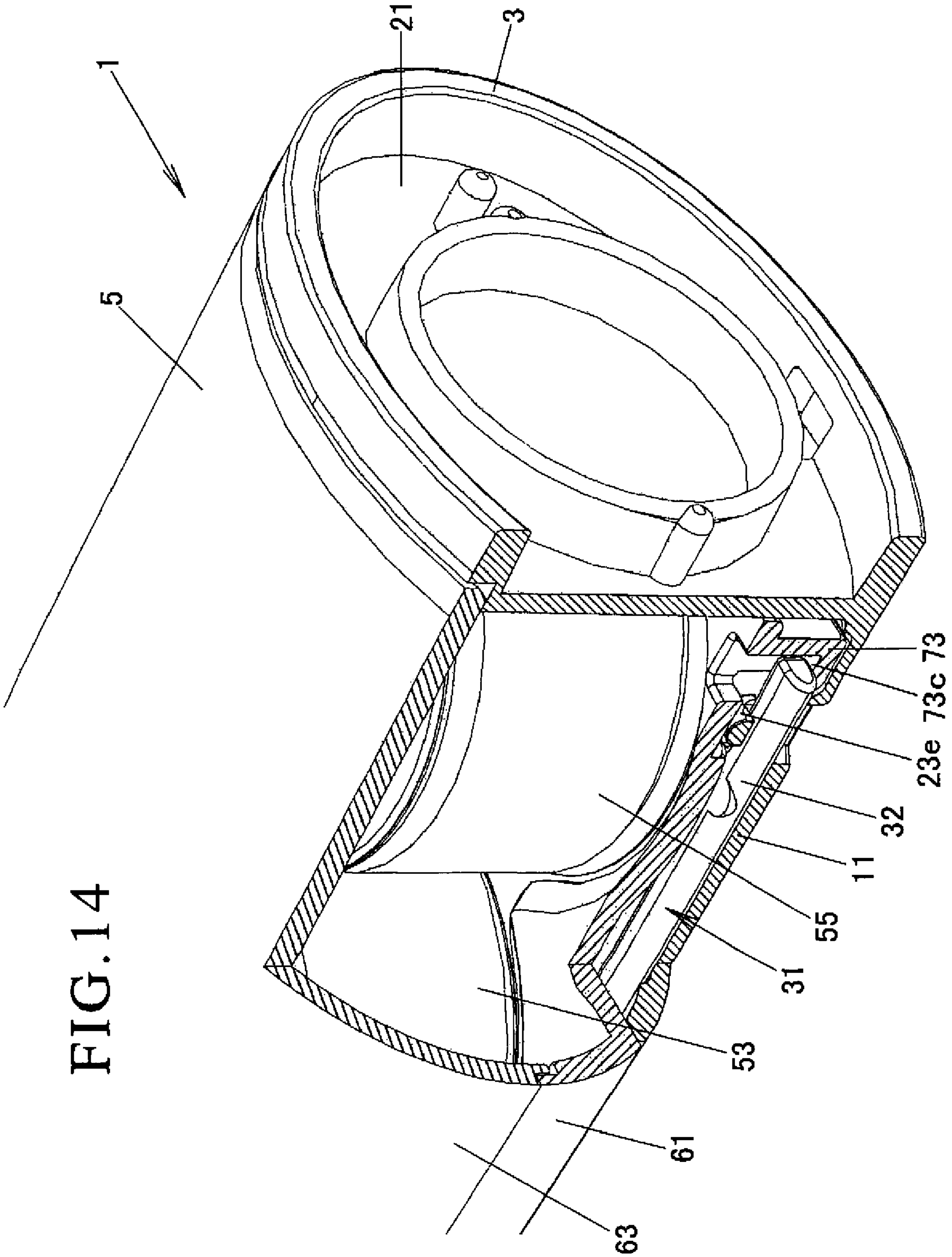
FIG. 14 is a partially cut-away perspective view of the application-film transfer tool according to an embodiment of the present invention.

Similarly, with the back end section of the refill 5, by the sliding securing member 13 sliding toward the back, the locking member 31 slides toward the back and the back ends of the latching rods 32 engage with the hooks 73, as illustrated in FIG. 14. In this way, movement of the refill 5 toward the top is restricted. Therefore, even when a force of pulling the refill 5 that is secured to the main body 3 upward is applied, the lower-edge plates 73*c* of the hooks 73 and the sections near the back ends of the latching rods 32 latch together, and the back end of the refill 5 does not detach upward. Thus, the refill 5 is firmly secured to the main body 3.

The refill securing mechanism of the application-film transfer tool 1 according to this embodiment includes the plurality of engagement protrusions 72 and plurality of hooks 73, which are provided on the bottom surface of the placement case 61 of the refill 5, the engagement depressions 23*d* provided on the base member 11 of the main body 3, the sliding securing member 13, and the locking member 31 slidably disposed on the base member 11.

Accordingly, with the application-film transfer tool 1, when the refill 5 is placed on the main body 3, the refill 5 can be easily positioned by engaging the engagement protrusions 72 and the engagement depressions 23*d*. The application-film transfer tool 1 according to this embodiment can easily hold the refill 5 by sliding the sliding securing member 13 toward the back when the refill 5 is placed on the base member 11. Furthermore, the application-film transfer tool 1 according to this embodiment can firmly hold the refill 5 since the hooks 73 and the locking member 31 are latched together when the sliding securing member 13 is slid toward the back. In this way, the refill 5 can be prevented from detaching from the main body 3, and wobbling during use can be prevented.

In the application-film transfer tool 1 according to this embodiment, the engagement protrusions 72 and the hooks 73 are provided on the bottom surface of the placement case 61 near the back edge, and the back end section of the refill 5 is latched together with the locking member 31. Thus, the front section of the refill 5 is held by the sliding securing member 13 and the back section is latched together with the locking member 31, reliably securing the refill 5 to the main body 3. That is, when there are no latched sections of the locking member 31 and the hooks 73, the refill 5 is held only by the sliding securing member 13 of the main body 3. Thus, when a strong force is applied to the back section of the refill 5 in the top-to-bottom direction, the refill 5 might be detached. Such detachment of the refill 5, however, can be prevented by latching together the locking member 31 and the hooks 73.

In the application-film transfer tool 1 according to this embodiment, the back end of the locking member 31 has the resilient parts 33*d*, and the back face plate 21 of the base member 11 and the resilient parts 33*d* are engaged. In this way, the locking member 31 is urged toward the front, and, thus, when the sliding securing member 13 is slid toward the front, the latching of the hooks 73 and the locking member 31 is automatically released, and the refill 5 can be easily detached.

The sliding securing member 13 and the base member 11 are latched together by the latching member 35. However, when the operating part 35*b* of the latching member 35 is pushed, the latching of the latching opening 41*a* of the sliding securing member 13 and the latching protrusion 35*e* of the latching member 35 is released, and the sliding securing member 13 slides toward the front by being urged toward the front by the locking member 31. Consequently, the latching of the sliding securing member 13 and the base member 11 can be easily released.

Accordingly, this embodiment provides a small application-film transfer tool 1 that enables easy replacement of a refill 5 and that enables stable transfer of an application film without wobbling and displacement of the refill 5 loaded onto a main body 3 and reduces the amount of waste.

The present invention is not limited to the embodiment described above and may be freely modified within the scope of the invention.

What is claimed is:

1. An application-film transfer tool comprising:

a main body;

a refill that is attachable to and detachable from the main body; and a refill securing mechanism for securing the refill to the main body, wherein the main body includes, a base member having a power transmission mechanism interlocking a supply bobbin and a take-up bobbin and a sliding securing member slidably attached to the base member and positionable to hold a front end of the refill, wherein the refill includes, the supply bobbin around which a transfer tape is wound, the take-up bobbin for taking up the transfer tape after use, and a refill case having a transfer head at the front end of the refill, wherein the refill securing mechanism includes, a plurality of engagement protrusions and a plurality of hooks, all provided on a surface of the refill case that faces the main body when the refill is loaded onto the main body, engagement depressions provided on the base member of the main body, a locking member slidably attached only to the base member, and confined entirely within the base member, such that the locking member is concealed within the assembled application film transfer tool, and the sliding securing member and wherein the refill is secured to the main body by engaging the engagement protrusions of the refill with the engagement depressions of the base member, latching together the sliding securing member and a section near the front end of the refill; and latching together the locking member and the hooks.

2. The application-film transfer tool according to claim 1, wherein the refill has opposite sides and a back end and the engagement protrusions are provided on the surface of the refill case near the back end of the refill and near both said opposite sides, the surface facing the main body when the refill is placed on the main body, wherein each of the hooks includes a back face plate provided near and inward of the engagement protrusions and positioned toward the back end of the refill, an inner face plate extending toward the front end of the refill and perpendicularly from the inner edge of the back face plate, and a bottom face plate provided perpendicularly to the bottom edges of the back face plate and the bottom edge of the inner face plate, wherein the locking member includes two parallel latching rods extending in the front-to-back direction and having front end sections and back ends, and a connecting member connecting the two latching rods near the back ends of the latching rods, and wherein the sliding securing member has a back end section and the back end of the refill is latched together with the main body as a result of the front end sections of the latching rods contacting the back end section of the sliding securing member when the sliding securing member slides toward the back end of the refill, the locking member sliding toward the back end of the refill, and the back ends of the latching rods being inserted into the hooks.

3. The application-film transfer tool according to claim 2, wherein the connecting member of the locking member has a back end and the base member has a back face plate and the back end of the connecting member of the locking member has a resilient part, and wherein the locking member is urged toward the front end of the refill by engaging the back face plate of the base member and the resilient part of the locking member.

* * * * *

UNITED STATES PATENT AND TRADEMARK OFFICE

CERTIFICATE OF CORRECTION

PATENT NO. : 8,291,954 B2
APPLICATION NO. : 12/906596
DATED : October 23, 2012
INVENTOR(S) : Yasuo Narita It is certified that error appears in the above-identified patent and that said Letters Patent is hereby corrected as shown below:

Column 1
Line 49,
After “which” insert --a--.

Column 12
(Claim 1, Line 37)
Change “;” to --,--.

Signed and Sealed this
Twenty-ninth Day of January, 2013

David J. Kappos
*Director of the United States Patent and Trademark Office*